(No Model.) 2 Sheets—Sheet 1.
J. FERGUSON.
PRESS PLATEN.
No. 291,179. Patented Jan. 1, 1884.
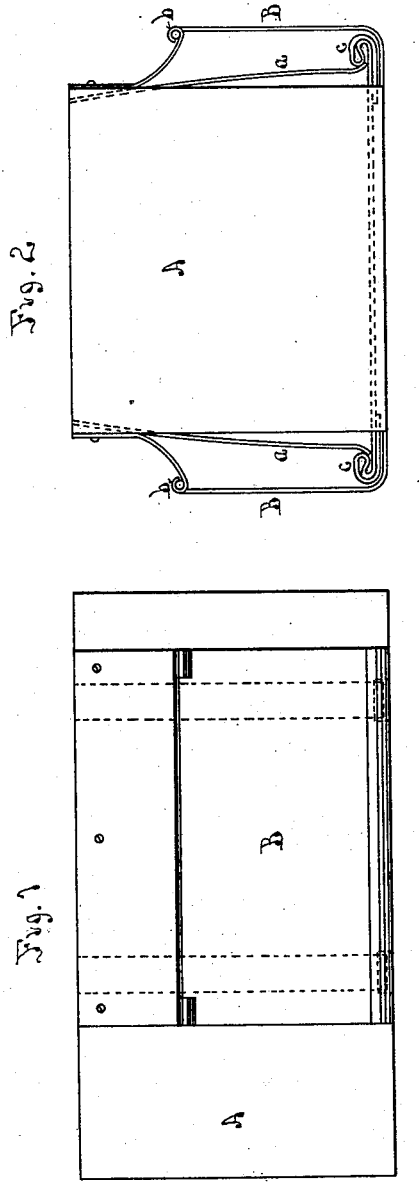
Witnesses
Wm. S. Brown
N. P. Ockington
Inventor
James Ferguson
By David Hall Rice
Atty.

(No Model.)  2 Sheets—Sheet 2.
J. FERGUSON.
PRESS PLATEN.
No. 291,179.  Patented Jan. 1, 1884.
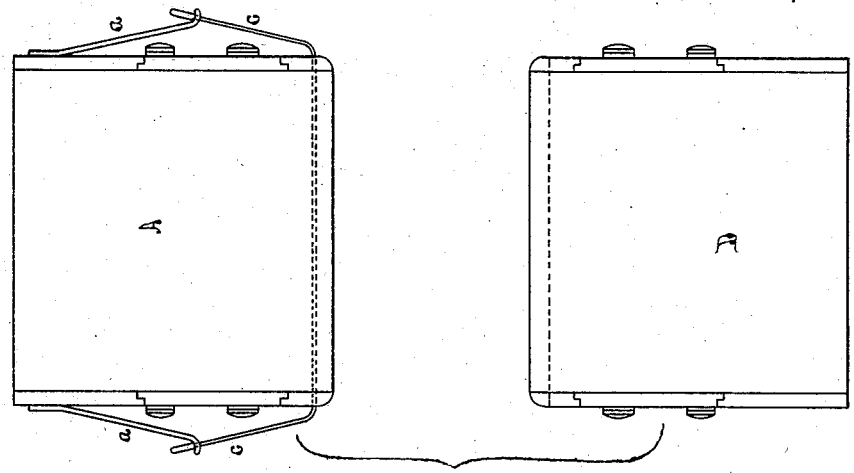
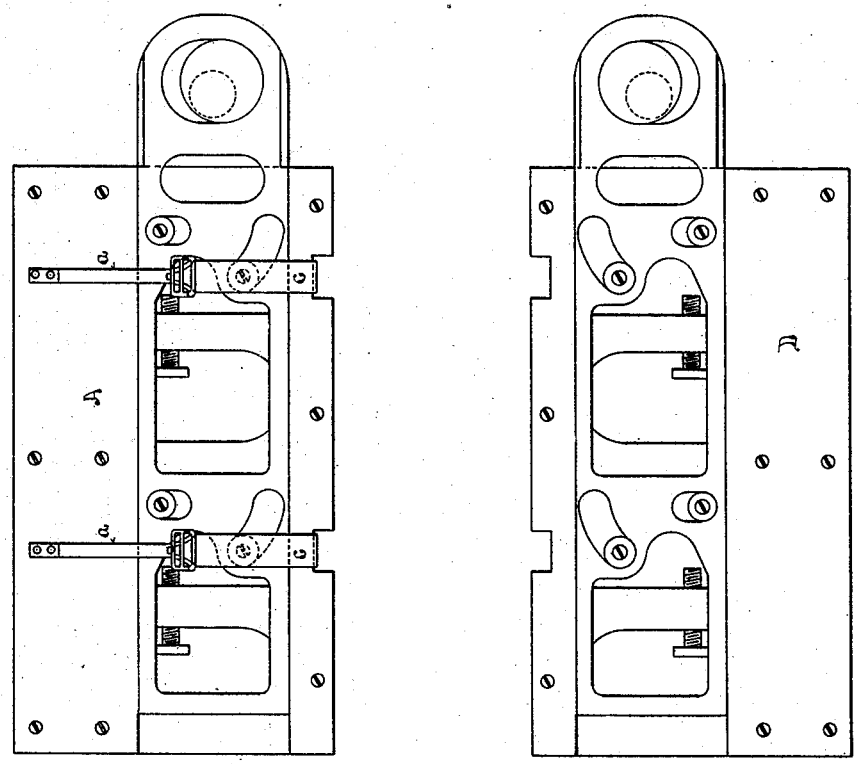
Witnesses
Wm. S. Brown
N. P. Ockington
Inventor
James Ferguson
By David Hall Rice
Atty.

UNITED STATES PATENT OFFICE.

JAMES FERGUSON, OF BRIDGEWATER, MASSACHUSETTS.

PRESS-PLATEN.

SPECIFICATION forming part of Letters Patent No. 291,179, dated January 1, 1884.

Application filed September 29, 1883. (No model.)

*To all whom it may concern:*

Be it known that I, JAMES FERGUSON, of Bridgewater, in the county of Plymouth and State of Massachusetts, have invented a new and useful Improvement in Press-Platens, of which the following is a specification.

My improvement relates to the platens of cotton and other presses; and it consists in applying to such platens elastic or spring hooks for holding the band in position while the bale is being put in place, and also holding the band under tension, so as to keep it straight and without kinks or buckling in the grooves of the press-platten until it is ready to fasten around the bale.

It further consists in holding the projecting ends of the bands in the spring-hooks, so that they will be in a convenient position to be grasped and unloosened in the act of tying around the bale.

It further consists in providing a guard or shield over the holding-hooks and ends of the bands on one or both sides of the platen, to prevent the ends of the bands and holding-hooks being struck by the bale accidentally while it is being inserted between the platens, and the hooks unloosed and the ends of the bands bent and twisted, so as to prevent the tying of them readily around the bale.

In the drawings, Figure 1 represents the side of a press-platen, with the protecting shield closed down over the bands and hooks. Fig. 2 represents an end view of the same. Fig. 3 is a side view of a pair of press-platens, of somewhat different patterns, showing the hooks with the shield removed from the upper one. Fig. 4 is an end view of the same.

A is the press-platen. B is a pivoted or hinged shield turning upon the joint *b*, and having its lower edge resting against the press-platen below the ends of the band *c*, which is placed in the grooves of the platen, as shown in dotted lines, and has the spring-hooks *a*, catching into and holding its opposite ends and keeping the band under tension and in place in the groove, ready for the insertion of the bale between the platens. These parts remain in the position shown in Figs. 1 and 2 until the pressing of the cotton-bale is finished, and serve to keep the band in the best position for tying around the bale, and entirely out of the way while the bale is being inserted between the platens, the shield B protecting the end of the band and the hooks *a* until the band is ready to be fastened around the bale, when the shield B is swung upward on its pivot until thrown backward against the platen above the latter, and the band is sprung off of the securing-hooks *a* and fastened around the bale. If the shield B is not used, the end of the band and the spring-hooks *a* are very certain to be struck by the bale while placing it in the press when the band is unfastened and dropped down in the way, and its end is bent and twisted, so as to render it difficult to tie around the bale.

Figs. 1 and 2 represent the ordinary press-platen, with the groove made just deep enough to receive the band.

Figs. 3 and 4 represent a pair of press-platens having adjustable bars in their grooves, such as are shown in my application for a patent filed November 10, 1882. In Figs. 3 and 4 the hooks are somewhat shorter and have a claw shape at the end to receive the band between the claws, and have the buckles catch on the claw on each side of the band; but the hooks serve substantially the same purpose as those in Figs. 1 and 2.

D represents the lower press-platen in position with relation to the upper one which it has in the press.

In using the platen shown in Figs. 3 and 4, the bars are brought down against the bands after the bale is inserted in the press, thus increasing the tension which the hooks *a* exert upon the band before the pressing is accomplished and after the bale is in place in the press, and thus aids in rendering the band straight and smooth where the bale comes against it in pressing. It will be observed that these spring-hooks serve to put a longitudinal tension upon the band, as well as hold it in place in the groove, and that they hold the end of the band in a definite position, ready to be grasped and carried around the bale in tying it.

What I claim as new and of my invention is—

1. In combination with the press-platen A, the spring-hook $a$, adapted to bring a longitudinal tension upon the band, substantially as described.

2. In combination with the press-platen, the band-hook $a$, and the protecting-shield B, substantially as described.

3. In combination with the press-platen, the band-hook $a$, provided with a claw-shaped end, substantially as described.

JAMES FERGUSON.

Witnesses:
DAVID HALL RICE,
N. P. OCKINGTON.